United States Patent
Park et al.

(10) Patent No.: US 8,929,348 B2
(45) Date of Patent: Jan. 6, 2015

(54) METHOD AND APPARATUS FOR CONNECTING WIRELESS NETWORK IN A DIGITAL DEVICE

(75) Inventors: Woo-Jin Park, Yongin-si (KR); Seong-Il Hahm, Siheung-si (KR); Jin-Wook Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 566 days.

(21) Appl. No.: 13/198,501

(22) Filed: Aug. 4, 2011

(65) Prior Publication Data

US 2012/0033568 A1 Feb. 9, 2012

(30) Foreign Application Priority Data

Aug. 5, 2010 (KR) .................. 10-2010-0075504

(51) Int. Cl.
*H04W 4/00* (2009.01)
*H04W 76/02* (2009.01)
*H04W 84/18* (2009.01)
*H04W 8/26* (2009.01)

(52) U.S. Cl.
CPC ............ *H04W 76/023* (2013.01); *H04W 84/18* (2013.01); *H04W 8/26* (2013.01)
USPC .............................. 370/338; 370/328; 455/446

(58) Field of Classification Search
None
See application file for complete search history.

(56) References Cited

U.S. PATENT DOCUMENTS

| 8,149,715 | B1 * | 4/2012 | Goel et al. ..................... 370/238 |
| 8,478,304 | B1 * | 7/2013 | David et al. ................ 455/456.5 |
| 2007/0189321 | A1 | 8/2007 | Lee et al. |
| 2008/0139125 | A1 | 6/2008 | Son et al. |
| 2009/0238093 | A1 | 9/2009 | Saneto |
| 2010/0091657 | A1 * | 4/2010 | Tsfaty et al. .................. 370/241 |
| 2011/0301912 | A1 * | 12/2011 | Pandey et al. ................ 702/150 |

FOREIGN PATENT DOCUMENTS

| EP | 1 617 574 A1 | 1/2006 |
| EP | 2 219 412 A2 | 8/2010 |
| KR | 10-2006-0081232 | 7/2006 |
| KR | 10-2001-0136255 | 12/2010 |

OTHER PUBLICATIONS

European Search Report dated Nov. 2, 2011 in connection with European Patent Application No. EP 11 17 5320.
Office Action dated Aug. 13, 2014 in connection with European Patent Application No. EP 11 175 320.8—1854; 5 pages.

* cited by examiner

Primary Examiner — Bob Phunkulh

(57) ABSTRACT

A method and apparatus for connecting a wireless network in a digital device are provided. The method of connecting the wireless network of the digital device includes receiving a signal from a peer digital device, comparing Receive Signal Strength (RSS) of the received signal with a specified threshold to determine whether the peer digital device is located nearby, if it is determined that the peer digital device is located nearby, establishing a Wireless Local Area Network (WLAN) connection to the peer digital device, and automatically executing an application program that uses the WLAN connection.

20 Claims, 8 Drawing Sheets

METHOD AND APPARATUS FOR CONNECTING WIRELESS NETWORK IN A DIGITAL DEVICE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 5, 2010 and assigned Serial No. 10-2010-0075504, the entire disclosure of which is hereby incorporated by reference.

TECHNICAL FILED OF THE INVENTION

The present invention relates to wireless networks, and more particularly, the present invention relates to a method and apparatus for connecting digital devices to wireless networks.

BACKGROUND OF THE INVENTION

With the development of wireless technologies, there is ongoing research to support a Wireless Local Area Network (WLAN) in digital devices such as laptop computers, Personal Digital Assistants (PDAs), an the like. For example, a WLAN communication method of digital devices are under research in the Institute of Electrical and Electronics Engineers (IEEE) 802.11, Wi-Fi Alliance (WFA), Wi-Fi Protected Setup (WPS), and WFA Wi-Fi Direct standard. Conventional WLAN communication methods may be classified in an infra structure mode and an ad-hoc mode. The infra structure mode generally refers to a digital device that operates as a STAtion (STA) that is connected to a digital device that operates as an Access Point (AP). The ad-hoc mode generally refers to a plurality of digital devices that operate as STAs that are directly connected.

The IEEE 802.11 standard supports both the infra structure mode and the ad-hoc mode. In the infra structure mode and the ad-hoc mode of the IEEE 802.11 standard, when one digital device determines a Service Set IDentifier (SSID), a security key, and an Internet Protocol (IP) address allocation rule, a peer digital device may then search for the SSID, input the security key, and thereafter configure the IP address according to the determined IP address allocation rule. In doing so, a WLAN connection is established between the digital devices.

The WFA WPS standard supports the infra structure mode, while the WFA Wi-Fi Direct standard supports the ad-hoc mode. In the infra structure mode of the WFA WPS standard and the ad-hoc mode of the WFA Wi-Fi Direct standard, when a Push Button Configuration (PBC) button is pressed or when a Personal Identification Number (PIN) is generated in one particular digital device, the PIN is input by a peer digital device to establish a WLAN connection.

In the conventional WLAN connection method described above, in order to establish a WLAN connection in a digital device, a user must directly configure and input information necessary for the WLAN connection, such as an SSID, a security key, an IP address, a PIN, and the like. However, since preliminary information on the WLAN is often required procedure for directly configuring and inputting information necessary for the WLAN connection, the method cannot be easily used by general users.

SUMMARY OF THE INVENTION

To address the above-discussed deficiencies of the prior art, it is a primary object to provide some, none, or all of the advantages described below. Accordingly, an aspect of the present invention is to provide a method and apparatus for connecting digital devices to a Wireless Local Area Network (WLAN).

Another aspect of the present invention is to provide a method and apparatus for automatically connecting a WLAN between digital devices and for executing an application program based on the WLAN.

Another aspect of the present invention is to provide a method and apparatus for automatically connecting a WLAN between neighboring digital devices.

Another aspect of the present invention is to provide a method and apparatus for connecting a WLAN by generating information required for connecting the WLAN by obviating or reducing user input to a digital device.

Another aspect of the present invention is to provide a method and apparatus for connecting a WLAN in such a manner that information required for connecting the WLAN is generated by sharing a random number among two or more digital devices.

Another aspect of the present invention is to provide a method and apparatus for generating a management frame for connecting a WLAN to a digital device.

In accordance with an aspect of the present invention, a method of connecting a digital device to a wireless network is provided. The method includes receiving a signal from a peer digital device, comparing Receive Signal Strength (RSS) of the received signal with a specified threshold to determine whether the peer digital device is located nearby, if it is determined that the peer digital device is located nearby, establishing a WLAN connection to the peer digital device, and automatically executing an application program that uses the WLAN connection.

In accordance with another aspect of the present invention, an apparatus for connecting a digital device to a wireless network is provided. The apparatus includes a WLAN module for receiving a signal from a peer digital device, and a controller for comparing RSS of the received signal with a specified threshold to determine whether the peer digital device is located nearby. If it is determined that the peer digital device is located nearby, establishing a WLAN connection to the peer digital device to automatically execute an application program that uses the WLAN connection.

Other aspects, advantages and salient features of the invention will become apparent to those skilled in the art from the following detailed description, figures, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures

DETAILED DESCRIPTION OF THE INVENTION

FIGS. 1 to 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification The present invention described hereinafter relates to a method and apparatus for automatically connecting a Wireless Local Area Network (WLAN) between digital devices and for executing an application program based on the WLAN.

Figure 1:
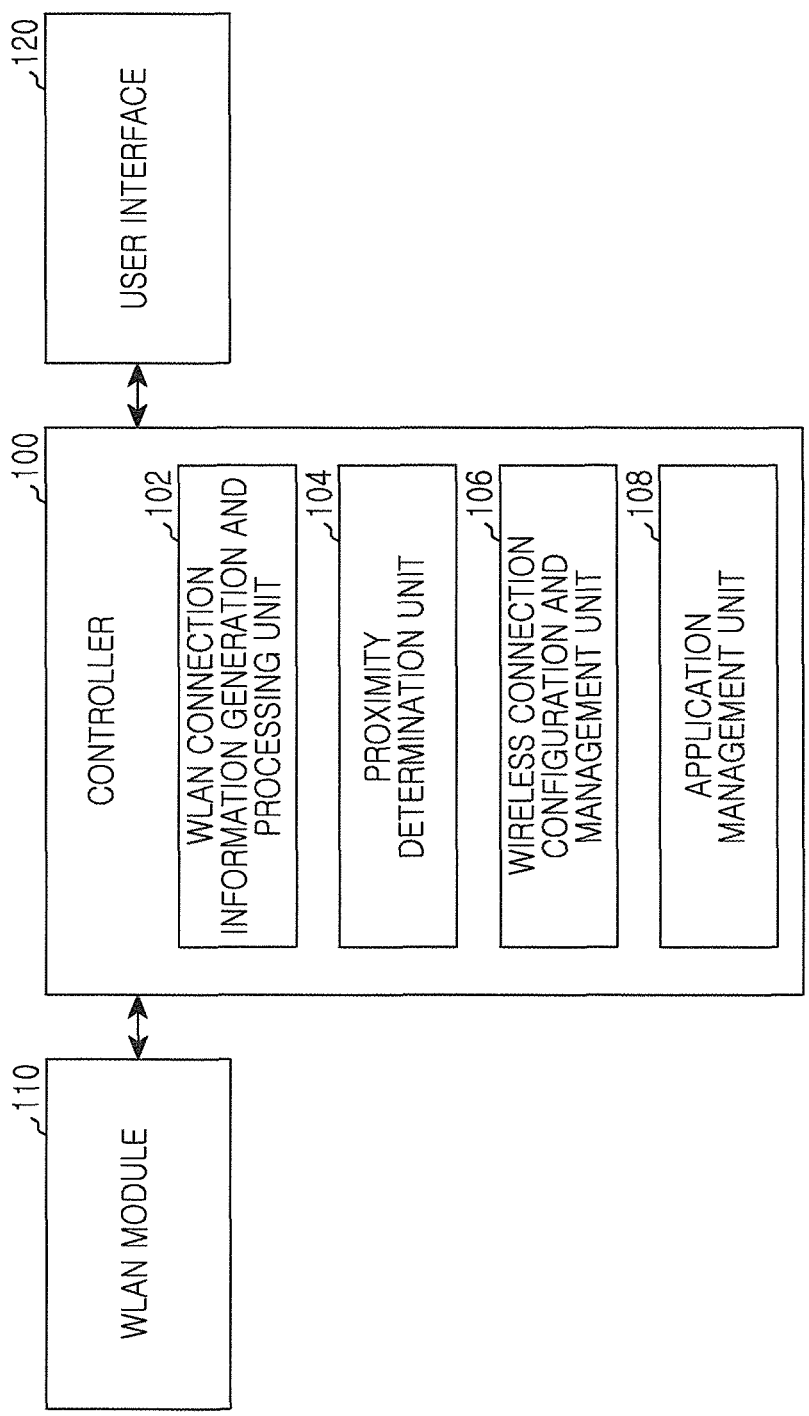
FIG. 1 illustrates an example digital device according to this disclosure.

FIG. 1 illustrates an example digital device according to this disclosure.

The digital device includes a controller 100, a WLAN module 110, and a user interface 120. In particular, the controller 100 includes a WLAN connection information generation and processing unit 102, a proximity determination unit 104, a wireless connection configuration and management unit 106, and an application management unit 108.

The controller 100 controls and processes several operations of the digital device. In particular, the controller 100 controls and processes one or more functions for automatically connecting a digital device to a WLAN and then executing an application program based on the WLAN connection.

Figure 2:
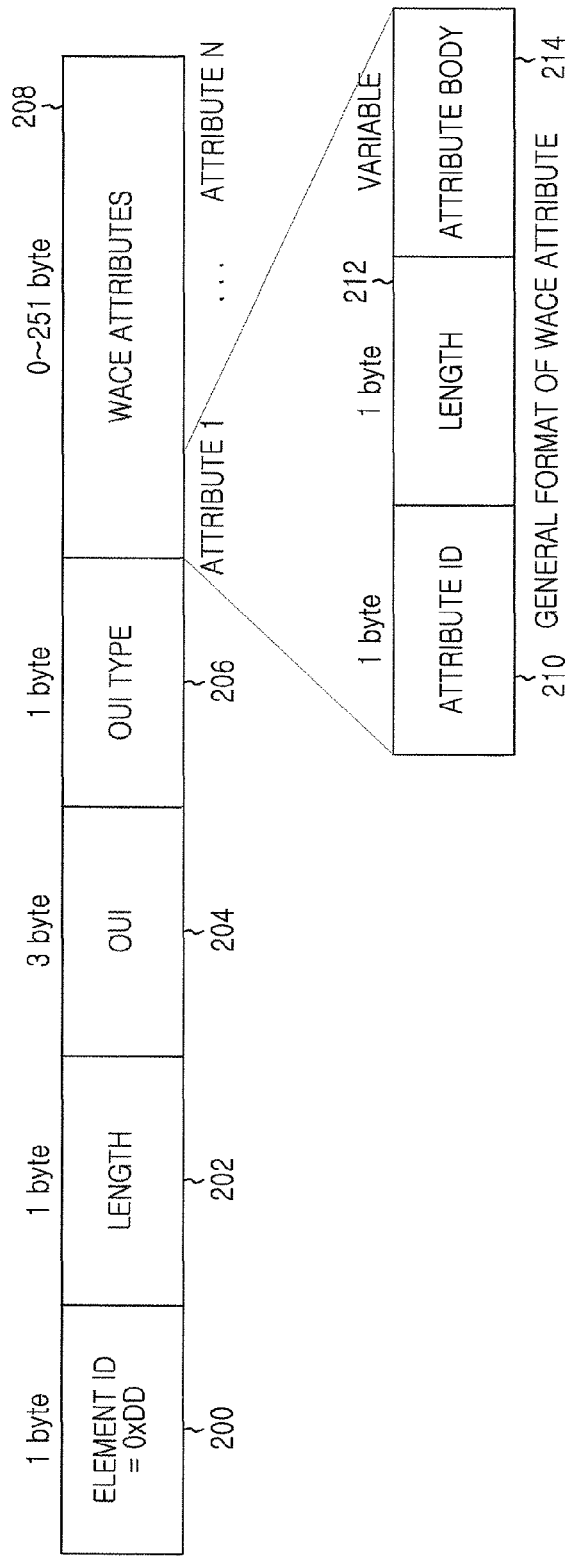
FIG. 2 illustrates a structure of a management frame for automatically connecting a digital device to a Wireless Local Area Network (WLAN) according to this disclosure.

More specifically, under the control of the controller 100, the WLAN connection information generation and processing unit 102 generates information necessary for the WLAN connection and other information necessary for executing the application program. Further, the WLAN connection information generation and processing unit 102 generates management frames including various types of information for the WLAN connection. In one embodiment, the management frame includes a beacon frame, a probe request frame, and a probe response frame. The management frame is configured as illustrated in FIG. 2. That is, information as shown in FIG. 2 may be added as a portion to a management frame to be used autonomously by each vendor. A structure of the management frame is described below in detail with reference to FIG. 2 and its accompanying tables.

The WLAN connection information generation and processing unit 102 analyzes the management frames received from a peer digital device and obtains information that may be used to automatically connect to the WLAN. The WLAN connection information generation and processing unit 102 determines whether to automatically connect the WLAN by determining whether the obtained information is valid, and whether the peer digital device supports a function for executing a corresponding application program by automatically connecting the WLAN. This determination may be referred to as a Wi-Fi Auto Configuration and Execution (WACE)). Whether the obtained information is valid and whether the WACE function is supported may be determined by using a vendor IDentifier (ID) and a WACE function On/Off flag that is described below with reference to FIG. 2.

The proximity determination unit 104 measures Receive Signal Strength (RSS) on the basis of the frame received from the peer digital device, and compares the measured RSS with a threshold to determine whether the peer digital device is located near the digital device. If the RSS is greater than the threshold, the proximity determination unit 104 further determines whether the peer digital device is located near the digital device If the RSS is less than or equal to the threshold, the proximity determination unit 104 may then determine that the peer digital devices is not located near the digital device.

The wireless connection configuration and management unit 106 controls an active state of the WLAN module 110. That is, if the WLAN-based application program is executed by a user or if it is determined by the proximity determination unit 104 that the peer digital device is located nearby, the wireless connection configuration and management unit 106 confirms the active state and sets the WLAN mode 100 to the active state. Further, if it is determined that the peer digital device is located nearby, the wireless connection configuration and management unit 106 automatically connects the peer digital device to the WLAN. For this, the wireless connection configuration and management unit 106 generates a random number directly or obtains the random number from the management frame received from the peer digital device, and generates at least one of a Service Set IDentifier (SSID), a security key (e.g., a Wired Equivalent Privacy (WEP) key, an Advanced Encryption Standard (AES) key, an Internet Protocol (IP) key, and/or a Personal Identification Number (PIN)) as information for the WLAN connection. On the basis of the generated information, the wireless connection configuration and management unit 106 connects the peer digital device and the WLAN. If the digital device operates in the ad-hoc mode of the Institute of Electrical and Electronics Engineers (IEEE) 802.11 standard, the wireless connection configuration and management unit 106 may determine an IP address allocation rule, or may determine an IP address according to the IP address allocation rule determined in the peer digital device.

When the digital device completes the WLAN connection to the peer digital device, the application management unit 108 executes the WLAN-based application program. The application management unit 108 may confirm that the WLAN-based application program executed in the peer digital device using the management frame received from the peer digital device, and may execute the WLAN-based application program corresponding to the confirmed application program. For example, when it is determined that a video transfer program is executed in the peer digital device, the digital device may execute a program for receiving and playing the video. The application management unit 108 may confirm the WLAN-based application program executed in the peer digital device by using a bitmap of an application list to be described below with reference to FIG. 2.

The WLAN module 110 processes signals transmitted and received through a WLAN under the control of the controller 100. The WLAN module 110 switches to an active or inactive state under the control of the controller 100. In addition, the WLAN module 110 establishes a WLAN connection to the peer digital device by using WLAN connection information stored in the controller 100.

The user interface 120 includes an input unit including at least one function key and a display unit for displaying information generated when the digital device operates. The input unit includes a keypad or a touch sensor, and provides data corresponding to a user input to the controller 100. That is, the input unit may provide data corresponding to a key pressed by the user and a coordinate of a position corresponding to a touch of the user to the controller 100. In addition, the display unit may display a variety of status information that is generated when the digital device operates, such as alphanumeric characters, still pictures, and moving pictures under the control of the controller 100.

FIG. 2 illustrates a structure of a management frame for automatically connecting a WLAN in a digital device according to this disclosure.

The management frame includes an element ID 200, a length 202, an Organizationally Unique Identifier (OUI) 204, an OUI type 206, and a WACE attribute 208. In particular, the WACE attribute 208 may include a plurality of pieces of attribute information, and each piece of attribute information includes an attribute ID 210, a length 212, and an attribute body 214.

The element ID 200 uses a value (e.g., 0xDD) defined by a standard so that it may be used by vendors. The length 202 may indicate a length of information included in the following fields. The OUI 204 may be an ID for indicating a vendor. The OUI type 206 may indicate version information of the vendor. In some embodiments, according to a design rule, the OUI 204 may be indicated by 4 bytes, and the OUI type 206 may be omitted. The WACE attribute 208 is a field that indicates a variety of information for automatically connecting the WLAN, and may include a device advertise attribute that indicates information on the digital device, an auto configuration attribute that indicates information necessary for the WLAN connection, and a status attribute that indicates a status of the digital device for a probe request.

Table 1 below shows the attribute ID 210 included in the WACE attribute 208.

TABLE 1

| Attribute ID | Notes |
| --- | --- |
| 0 | Device Advertise Attribute |
| 1 | Auto Configuration Attribute |
| 2 | Status Attribute |
| 3-220 | Reserved |
| 221 | Vendor Specific Attribute |
| 111-255 | Reserved |

Referring to Table 1 above, an attribute ID 201 is configured for each of the device advertise attribute, the auto configuration attribute, and the status attribute, for indicating attribute information included in the WACE attribute 208. In addition, the present invention configures an attribute ID for a specific vendor to the attribute ID 210, so that other vendors may add desired functions. In one embodiment, a value of the attribute ID may be modified variously depending on a design of the vendor.

Now, the device advertise attribute, the auto configuration attribute, and the status attribute will be described below in detail.

First, the device advertise attribute is information included in a beacon frame, a probe request frame, and a probe response frame of the digital device. An example of the device advertise attribute is shown in Table 2 below.

Table 2 Information included in the device advertise attribute.

TABLE 2

| Field | Size (Octets) | Value (Hexadecimal) | Description |
| --- | --- | --- | --- |
| Attribute ID | 1 | 0 | Identifying type of attribute |
| Length | 1 | Variable | Length of the following fields in the attribute |
| WACE Function On/Off Flag | 1 | True/False | WACE function on/off |
| WACE Supported Standard Flag | 1 | Variable | WACE supported Standard Flag(bit 0: IEEE 802.11 AP, bit 1: IEEE 802.11 STA, bit 2: WFA WPS AP, bit 3: WFA WPS STA, bit 4: WFA Wi-Fi Direct) |
| Application List | Variable | Bitmap | (Field size * 8) application provide per device |
| Category | 2 | WFA Wi-Fi Direct[3] | Device Type |
| Sub Category | 2 | | |

Referring to Table 2 above, the device advertise attribute includes a WACE function On/Off flag, a WACE supported standard flag, an application list, a category, and a sub category. The WACE function On/Off flag indicates whether the digital device supports a function for executing an application program by automatically connecting a WLAN, that is, whether the WACE function is in an active state. Accordingly, if the WLAN-based application program is executed in a state where the WACE function On/Off flag is set to Off, the WACE function On/Off flag may be set to On, and when the application program ends while being executed, the WACE function On/Off flag may be set to Off. The WACE function On/Off flag may be set by the user via the user interface 120. The WACE supported standard flag includes information that indicates a standard supported by the digital device, and may indicate a standard supported by the digital device by setting each bit. That is, in the WACE supported standard flag, at least one bit may be set to '1' according to the standard supported by the digital device. Further, the application list may indicate WLAN-based application programs provided by the digital device or other application programs currently being executed or to be executed among the application programs. Furthermore, the category and the sub category attributes include information that indicates a type of the digital device, and are configured identically to the WFA Wi-Fi Direct standard.

Next, the auto configuration attribute is information included in the probe request frame of the digital device, and may be configured by Table 3 below.

Table 3 Information included in the auto configuration attribute.

TABLE 3

| Field | Size(Octets) | Value(Hexadecimal) | Description |
|---|---|---|---|
| Attribute ID | 1 | 2 | Identifying type of attribute |
| Length | 1 | Variable | Length of the following fields in the attribute |
| Random Number | Variable | Variable | Random Number for generating Wi-Fi connection information |

Referring to Table 3 above, the auto configuration attribute includes random number information in the attribute body 214. The random number is used to generate at least one of an SSID, a security key (e.g., WEP, AES), an IP, and a PIN as information for configuring the WLAN connection. That is, the random number is generated automatically by a specified hash function, and is used to generate at least one of the SSID, the WEP, the AES, and the PIN depending on the specified hash function. In addition, the random number is used to configure the IP address depending on a specified rule. For example, according to the specified hash function, a 32-bit hash function may be obtained from the random number, and thereafter a prefix part of an IP address may be generated by using upper 24 bits of the hash value, and a host part of the IP address may be generated by performing a modulo operation on the 32-bit hash value. Of course, IP addresses of two digital devices to be connected through the WLAN are configured such that prefix parts are identical and host parts are different. A method of configuring the IP address will be described below in detail with reference to FIG. 7.

In addition, the status attribute is information included in the probe response frame of the digital device, and may be configured by Table 4 below.

Table 4 Information included in the status attribute.

TABLE 4

| Field | Size(Octets) | Value(Hexadecimal) | Description |
|---|---|---|---|
| Attribute ID | 1 | 24 | Identifying type of attribute |
| Length | 1 | 1 | Length of the following fields in the attribute |
| Status Code | 1 | Variable | A status code. |

Referring to Table 4 above, the status attribute includes status code information in the attribute body 214. The status code is information that indicates whether the WLAN connection of the digital device is allowed and that indicates a status of the digital device, and may be defined by Table 5 below.

TABLE 5

| status code | description |
|---|---|
| 0 | Allowed |
| 1 | Denied because of invalid parameters |
| 2 | Denied because a WAC AP is unable to accommodate request |
| 3 | Denied because the RSS is not stronger than the threshold |
| 4-255 | Reserved |

Referring to Table 5 above, a status code 0 indicates that a WLAN connection request is allowed, and status codes 1 to 3 indicate that the WLAN connection request is denied. In particular, the status code 1 may indicate a case where an attribute ID is wrong and where a WACE On/Off flag value is not 0 or 1. The status code 2 may indicate a case where the digital device is accessing to a Wi-Fi Protected Setup (WPS) Access Point (AP) or where a WACE function is not activated. The status code 3 may indicate a case where the WLAN connection is denied when RSS of the peer digital device is weaker than a threshold. That is, the status code 3 may be used to indicate that the WLAN connection is denied when the RSS of the peer digital device is less than or equal to the threshold even though the peer digital device that operates as a STAtion (STA) attempts the WLAN connection by transmitting the probe request frame to the digital device when the RSS of the digital device is greater than or equal to the threshold.

Figure 3A:
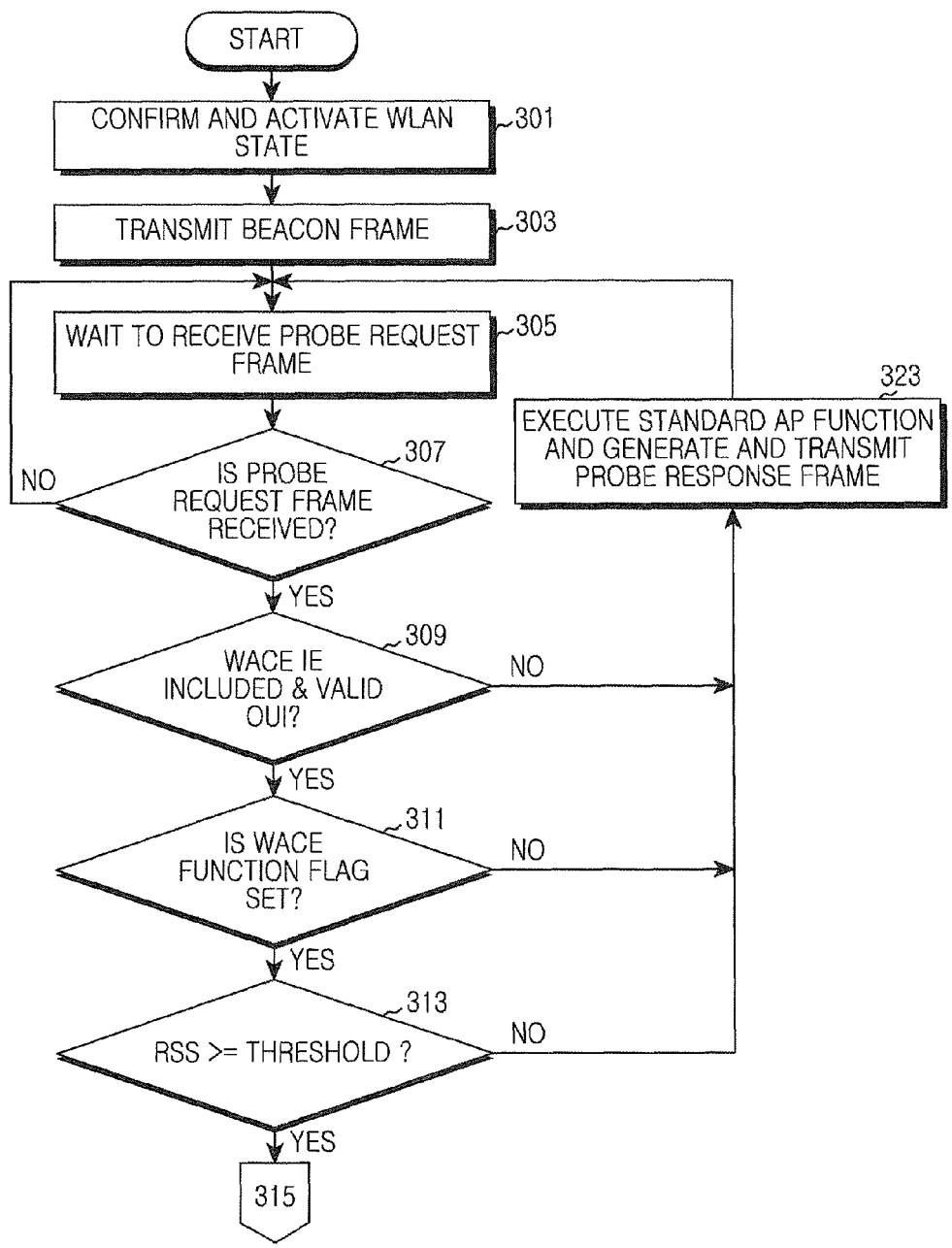
FIG. 3 illustrates an example WLAN connection process of a digital device that operates as an Access Point (AP) in an infra structure mode according to this disclosure.
Figure 3B:
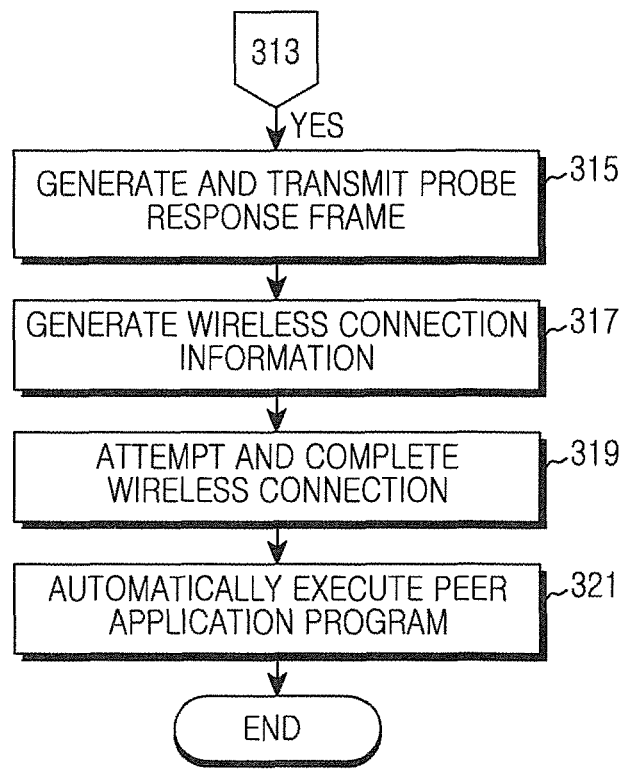

FIG. 3 illustrates an example WLAN connection process of a digital device that operates as an Access Point (AP) in an infra structure mode according to this disclosure. The digital device operates as the AP in the infra structure mode according to the Wi-Fi Alliance (WFA) WPS standard or the IEEE 802.11 standard.

The digital device activates a WLAN module by user's manipulation in step 301. That is, the user of the digital device may examine an active state of the WLAN module, and if the WLAN module is in an inactive state, may switch the WLAN module to the active state.

In step 303, the digital device transmits a beacon frame. In this particular embodiment, the beacon frame includes a management frame that indicates the device advertise attribute of the digital device as shown in Table 2 above. The digital device may set the WACE function On/Off flag according to whether a WLAN-based application program is being executed in the digital device or according to user's manipulation. The WACE function On/Off flag may also be configured fixedly to 'On' or 'Off' depending on a characteristic of the digital device. In addition, the digital device sets the WACE supported standard flag depending on the standard desired by the digital device. For example, if the standard desired by the digital device is the IEEE 802.11 and the WFA WPS, then the bit '0' and the bit '2' may be set to '1' according to Table 2 above, and the remaining bits may be set to '0'. In addition, the digital device may set a bit corresponding to application programs supported by the digital device among the WLAN-based application programs. For example, if the number of WLAN-based application programs is '8' and the application list consists of '8' bits, then each bit may express one application program, and thus the digital device may express an application program supported by the digital device by configuring the 8-bit application list. In addition, the digital device is configured such that the category and the sub category indicate a type of the digital device. In this embodiment, the digital device is configured depending on the WFA Wi-Fi Direct standard.

After transmitting the beacon frame including the aforementioned device advertise attribute, in step 305, the digital device waits to receive a probe request frame from a peer digital device that operates as an STA. In step 307, the digital device examines whether the probe request frame is received from the peer digital device. If the probe request frame is not received from the peer digital device, the procedure of FIG. 3 returns to step 305.

Otherwise, if the probe request frame is received from the peer digital device, in step 309, the digital device automatically connects the WLAN by analyzing the probe request frame, and examines whether information for executing the WLAN-based application program, i.e., WACE information, is included and whether the OUI 204 included in the probe request frame is valid. If the element ID 200 having a value of '0xDD' exists in the probe request frame, the digital device may determine that the WACE information is included in the probe request frame. In addition, the digital device may examine whether the OUI 204 included in the probe request frame indicates a vendor ID supported by the digital device in order to determine validity of the OUI 204.

If the WACE information is not included in the probe request frame or the included OUI 204 is invalid, proceeding to step 323, the digital device performs an AP function according to the conventionally known WFA WPS standard or IEEE 802.11 standard, and generates and transmits a probe response frame. In this embodiment, in order to indicate that it is not allowed to connect a WLAN and to execute an application program according to a request of the peer digital device, the digital device may set a status code of a status attribute included in the probe response frame to a value for indicating denial of a WLAN connection request.

Otherwise, if the WACE information is included in the probe request frame and the included OUI 204 is valid, in step 311, the digital device confirms the device advertise attribute from the probe request frame to determine whether the WACE function On/Off flag is set. If the WACE function On/Off flag is in an 'Off' state, the digital device confirms that the peer digital device is in a state of not supporting the WACE function, and proceeding to step 323, performs the AP function according to the conventionally known WFA WPS standard or the IEEE 802.11 standard, and generates and transmits the probe response frame.

Otherwise, if the WACE function On/Off flag is an 'On' state, the digital device confirms that the peer digital device is in a state of supporting the WACE function, and proceeding to step 313, compares RSS for the probe request frame with a specified threshold. This is to determine whether the peer digital device is located near the digital device.

If the RSS is less than or equal to the specified threshold, the digital device determines that the peer digital device is not located nearby, and proceeding to step 323, performs an operation of performing the AP function and generating and transmitting the probe response frame according to the conventionally known WFA WPS standard or IEEE 802.11 standard.

Otherwise, if the RSS is greater than the specified threshold, the digital device determines that the peer digital device is located nearby, and proceeding to step 315, generates the probe response frame in response to the probe request frame, and thereafter transmits the probe response frame to the peer digital device. The probe response frame includes the device advertise attribute describe in Table 2 above and the status attribute described in Table 4 above. In this embodiment, the digital device determines a standard to be supported by the digital device by considering a standard supported by the peer digital device, and expresses a standard, by which the peer digital device will operate, by using the WACE supported standard flag of the device advertise attribute. For example, in a case where the standard supported by the digital device is the IEEE 802.11 and the WFA WPS, upon receiving the probe request frame in which a WACE supported standard flag is set to an IEEE 802.11 STA from the peer digital device, it is determined that the digital device operates as an IEEE 802.11 AP, and a bit '0' of the WACE supported standard flag to be included in the probe response frame may be set to '1'. Of course, if the digital device and the peer digital device support both of the two standards, the digital device has to select only one standard between the two standards and has to set the WACE supported standard flag according to the selected standard. In addition, in order to indicate acceptance of connecting the WLAN and executing the application program according to a request of the peer digital device, the digital device may set a status code of the status attribute to a value that indicates acceptance of the WLAN connection request. Of course, if the digital device does not support the same standard as the peer digital device, the digital device may indicate denial of connecting the WLAN and executing the application program according to the request. In addition, if the digital device does not support an application program corresponding to that indicated by the peer digital device by the use of the device advertise attribute, the digital device may indicate denial of connecting the WLAN and executing the application program according to the request.

Figure 7:
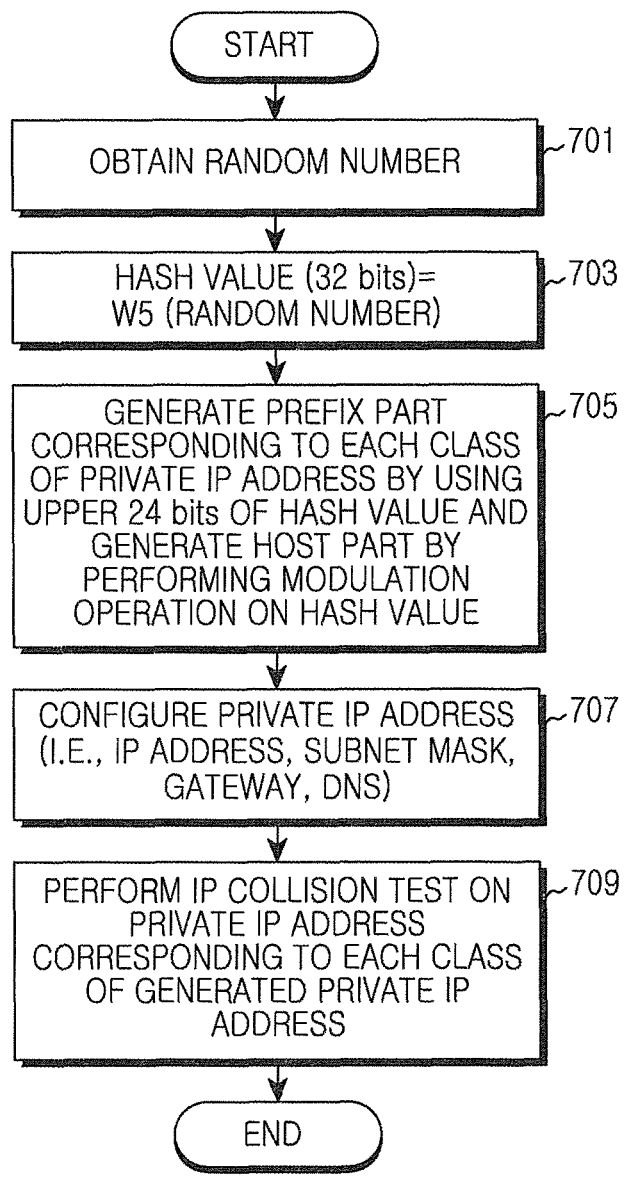
FIG. 7 illustrates an example process of generating an Internet Protocol (IP) address in a digital device according to this disclosure.

In step 317, the digital device obtains a random number from an auto configuration attribute included in the probe request frame received from the peer digital device and generates information necessary for the WLAN connection. The auto configuration attribute is configured by including the random number as shown in Table 3 above. In this embodiment, the digital device generates at least one of an SSID, a WEP, an AES, and a PIN by applying the random number to specified hash functions, and generates an IP address by using the random number according to a specified rule as shown in FIG. 7 below. For example, if the digital device and the peer digital device support the IEEE 802.11 standard, the digital device may generate the SSID, the AES, and the IP address, and if they support the FA WPS standard, the digital device may generate the PIN.

In step 319, the digital device attempts the WLAN connection to the peer digital device by using the generated information. If the WLAN connection is complete, proceeding to step 321, the digital device automatically executes a WLAN-based application program. The digital device performs a process for connecting the WLAN according to a standard determined by considering a standard supported by the digital device and a standard supported by the peer digital device. In addition, the digital device may confirm an application program being executed by the peer digital device from the device advertise attribute of the probe request frame, and may automatically execute an application program corresponding to the confirmed application program. For example, if the peer digital device executes a photo transfer program, the digital device may execute an application program for proving a function of receiving and editing a photo from the peer digital device.

Thereafter, the procedure of FIG. 3 ends.

Figure 4:
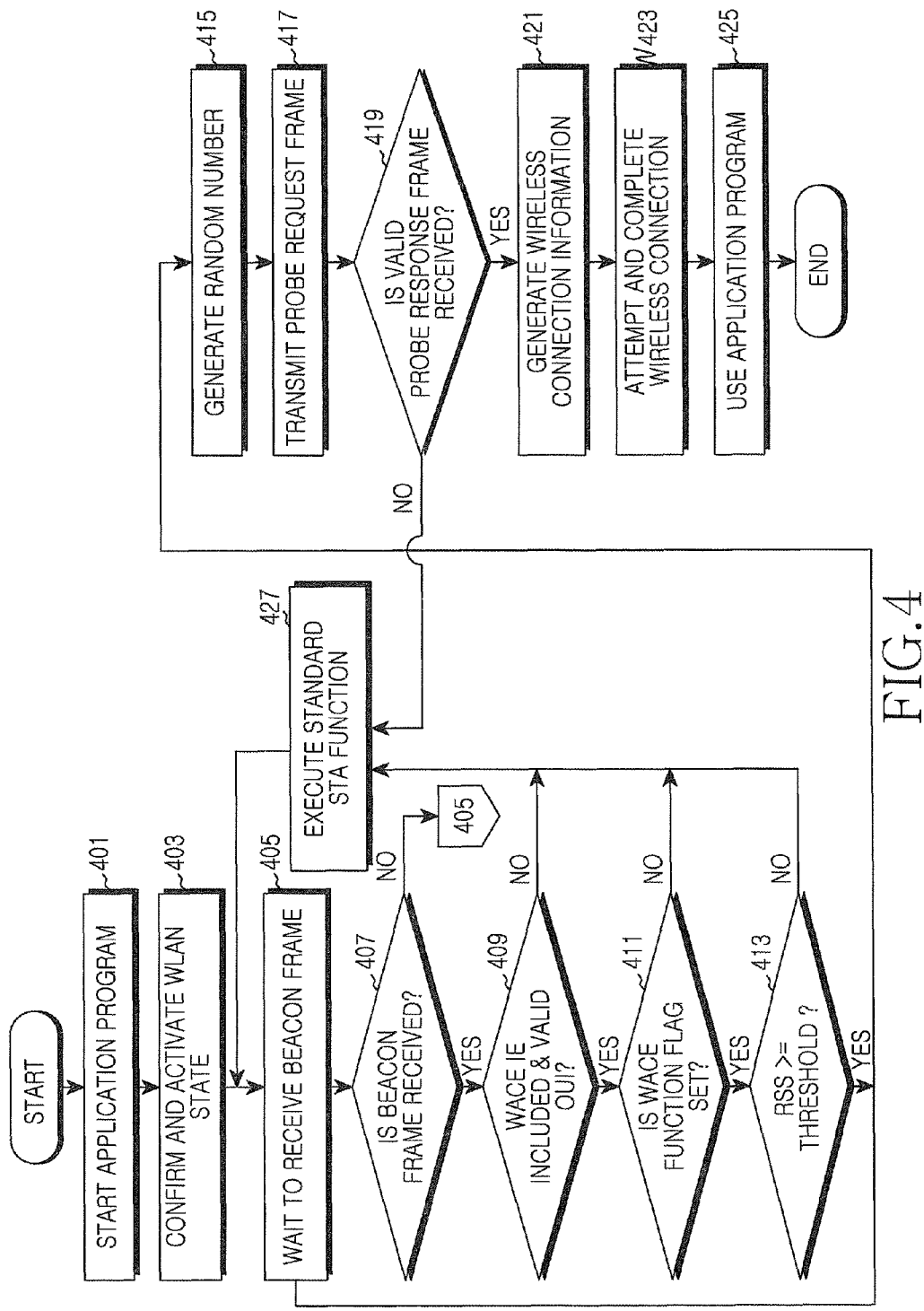
FIG. 4 illustrates an example WLAN connection process of a digital device that operates as a STAtion (STA) in an infra structure mode according to this disclosure.

FIG. 4 illustrates an example WLAN connection process of a digital device that operates as an STA in an infra structure mode according to this disclosure. The digital device operates as the STA in the infra structure mode according to the WFA WPS standard or the IEEE 802.11 standard.

When a WLAN-based application program starts by user's manipulation in step 401, proceeding to step 403, the digital device examines an active state of a WLAN module, and if the WLAN module is in an inactive state, switches the WLAN modules to the active state.

In step 405, the digital device waits to receive a beacon frame from a peer digital device that operates as an STA. In step 407, the digital device examines whether the beacon frame is received from the peer digital device. If the beacon frame is not received from the peer digital device, the procedure of FIG. 4 returns to step 405.

Otherwise, if the beacon frame is received from the peer digital device, in step 409, the digital device automatically connects the WLAN by analyzing the beacon frame, and examines whether information for executing the WLAN-based application program, i.e., WACE information, is included and whether the OUI 204 included in the beacon frame is valid. If the element ID 200 having a value of '0Xdd' exists in the beacon frame, the digital device may determine that the WACE information is included in the beacon frame. In addition, the digital device may examine whether the OUI 204 included in the beacon frame indicates a vendor ID supported by the digital device in order to determine validity of the OUI 204.

If the WACE information is not included in the beacon frame or the included OUI 204 is invalid, proceeding to step 427, the digital device performs an STA function according to the conventionally known WFA WPS standard or IEEE 802.11 standard.

Otherwise, if the WACE information is included in the beacon frame and the included OUI 204 is valid, in step 411, the digital device confirms a device advertise attribute from the beacon frame to determine whether the WACE function On/Off flag is set. If the WACE function On/Off flag is in an 'Off' state, the digital device confirms that the peer digital device is in a state of not supporting the WACE function, and proceeding to step 427, performs the STA function according to the conventionally known WFA WPS standard or the IEEE 802.11 standard.

Otherwise, if the WACE function On/Off flag is an 'On' state, the digital device confirms that the peer digital device is in a state of supporting the WACE function, and proceeding to step 413, compares RSS for the beacon frame with a specified threshold. This is to determine whether the peer digital device is located near the digital device.

If the RSS is less than or equal to the specified threshold, the digital device determines that the peer digital device is not located nearby, and proceeding to step 427, performs a function of performing the STA function according to the conventionally known WFA WPS standard or IEEE 802.11 standard.

Otherwise, if the RSS is greater than the specified threshold, the digital device determines that the peer digital device is located nearby, and proceeding to step 415, generates a random number for generating WLAN connection information. Thereafter, in step 417, the digital device transmits the probe request frame including the random number to the peer digital device. The probe request frame includes the device advertise attribute describe in Table 2 above and the auto configuration attribute described in Table 3 above. In this embodiment, the digital device sets the WACE function On/Off flag of the device advertise attribute to 'On', and sets the WACE supported standard flag to indicate one of the IEEE 802.11 STA and the WFA WPS is supported. In particular, the digital device may set an application list of the device advertise attribute to indicate the application program that starts in step 401, and thus may request the peer digital device to automatically connect the WLAN and then execute the application program.

In step 419, the digital device examines whether a valid probe response frame is received from the peer digital device. If a status code value included in the received probe response frame is a value that indicates acceptance of the WLAN connection request, the digital device may determine that the valid probe response frame is received, and if the status code value is a value that indicates denial of the WLAN connection request, may determine that an invalid probe response frame is received. If the invalid probe response frame is received, proceeding to step 427, the digital device performs the STA function according to the conventionally known WFA WPS standard or the IEEE 802.11 standard.

Otherwise, if the valid probe response frame is received, in step 421, the digital device generates information necessary for the WLAN connection on the basis of the generated random number. The digital device generates at least one of an SSID, a WEP, an AES, and a PIN by applying the random number to specified hash functions, and generates an IP address by using the random number according to a specified rule as shown in FIG. 7 to be described below. If the digital device and the peer digital device support the IEEE 802.11 standard, the digital device may generate the SSID, the WEP, the AES, and the IP address, and if they support the FA WPS standard, the digital device may generate the PIN.

In step 423, the digital device attempts the WLAN connection to the peer digital device by using the generated information, and if the WLAN connection is complete, proceeding to step 425, executes the application program that starts in step 401 on the basis of the connected WLAN. The digital device performs a process for connecting the WLAN according to a supported standard indicated by the WACE supported standard flag of the probe response frame received from the peer digital device.

Thereafter, the procedure of FIG. 4 ends.

Figure 5:
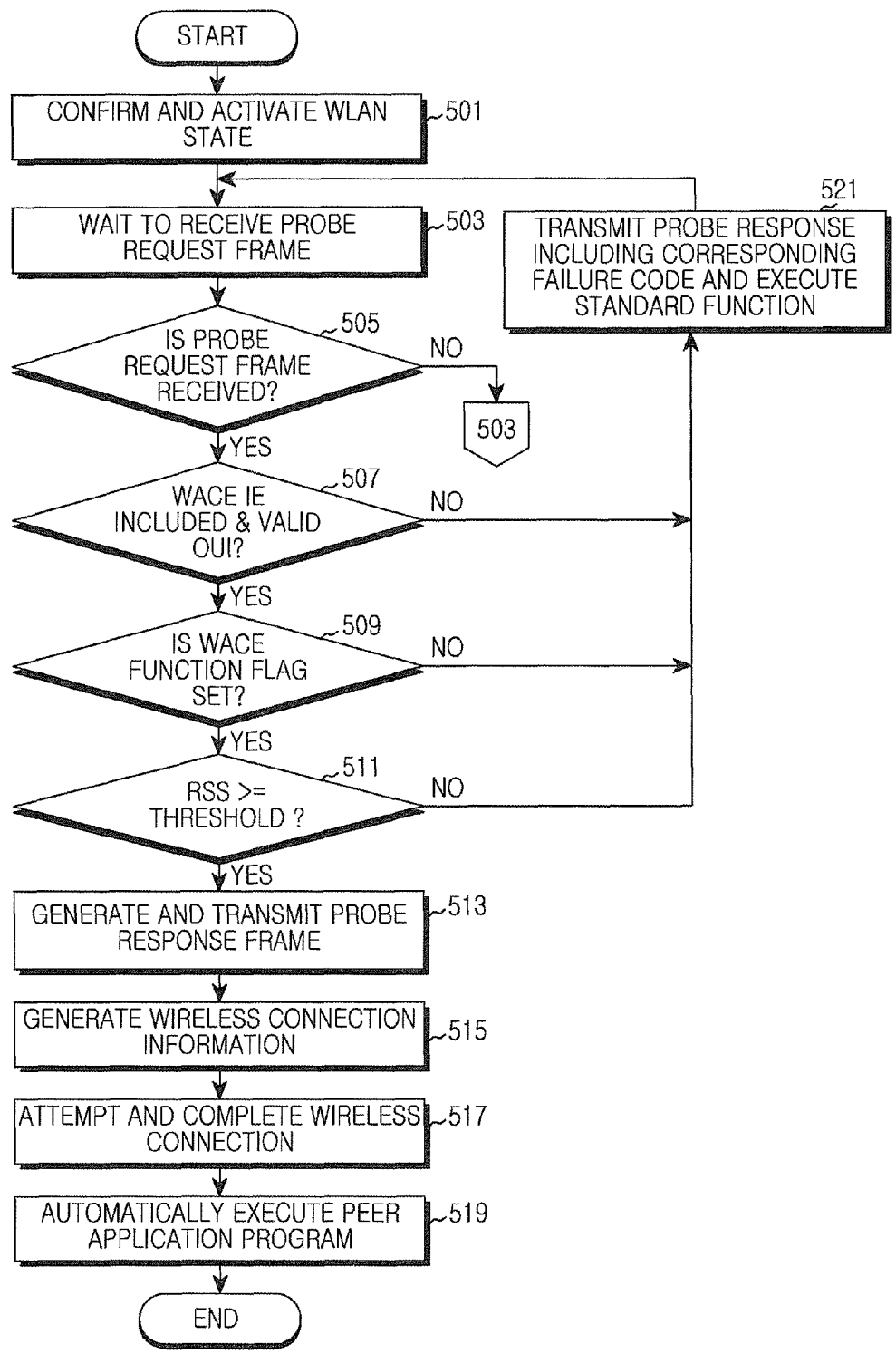
FIG. 5 illustrates an example WLAN connection process of a digital device in an ad-hoc mode according to this disclosure.

FIG. 5 illustrates an example WLAN connection process of a digital device in an ad-hoc mode according this disclosure. The digital device operates in the ad-hoc mode according to the WFA Wi-Fi Direct standard or the IEEE 802.11 standard.

The digital device activates a WLAN module by user's manipulation in step 501. That is, the user of the digital device may examine an active state of the WLAN module, and if the WLAN module is in an inactive state, may switch the WLAN module to the active state.

In step 503, the digital device waits to receive a probe request frame from the peer digital device. In step 505, the digital device examines whether the probe request frame is received from the peer digital device. If the probe request frame is not received from the peer digital device, the procedure of FIG. 5 returns to step 503.

Otherwise, if the probe request frame is received from the peer digital device, in step 507, the digital device automatically connects the WLAN by analyzing the probe request frame, and examines whether information for executing the WLAN-based application program, i.e., WACE information, is included and whether the OUI 204 included in the probe request frame is valid. If the element ID 200 having a value of '0xDD' exists in the probe request frame, the digital device may determine that the WACE information is included in the probe request frame. In addition, the digital device may examine whether the OUI 204 included in the probe request frame indicates a vendor ID supported by the digital device in order to determine validity of the OUI 204.

If the WACE information is not included in the probe request frame or the included OUI 204 is invalid, proceeding to step 521, the digital device generates and transmits a probe response frame, and operates according to the conventionally known WFA Wi-Fi Direct standard or IEEE 802.11 standard.

In this embodiment, in order to indicate that it is not allowed to connect a WLAN and to execute an application program according to a request of the peer digital device, the digital device may set a status code of a status attribute included in the probe response frame to a value for indicating denial of a WLAN connection request.

Otherwise, if the WACE information is included in the probe request frame and the included OUI 204 is valid, in step 509, the digital device confirms a device advertise attribute from the probe request frame to determine whether the WACE function On/Off flag is set. If the WACE function On/Off flag is in an 'Off' state, the digital device confirms that the peer digital device is in a state of not supporting the WACE function, and proceeding to step 521, generates and transmits a probe response frame, and operates according to the conventionally known WFA Wi-Fi Direct standard or IEEE 802.11 standard.

Otherwise, if the WACE function On/Off flag is an 'On' state, the digital device confirms that the peer digital device is in a state of supporting the WACE function, and proceeding to step 511, compares RSS for the probe request frame with a specified threshold. This is to determine whether the peer digital device is located near the digital device.

If the RSS is less than or equal to the specified threshold, the digital device determines that the peer digital device is not located nearby, and proceeding to step 521, generates and transmits a probe response frame, and operates according to the conventionally known WFA Wi-Fi Direct standard or IEEE 802.11 standard.

Otherwise, if the RSS is greater than the specified threshold, the digital device determines that the peer digital device is located nearby, and proceeding to step 513, generates the probe response frame in response to the probe request frame, and thereafter transmits the probe response frame to the peer digital device. The probe response frame includes the device advertise attribute describe in Table 2 above and the status attribute described in Table 4 above. In this embodiment, the digital device indicates a standard supported by the digital device by using the WACE supported standard flag of the device advertise attribute. In this embodiment, the WACE supported standard flag may be set on the basis of a standard supported by the digital device and a standard supported by the peer digital device. In addition, in order to indicate acceptance of connecting the WLAN and executing the application program according to a request of the peer digital device, the digital device may set a status code of the status attribute to a value that indicates acceptance of the WLAN connection request. Of course, if the digital device does not support the same standard as the peer digital device, the digital device may indicate denial of connecting the WLAN and executing the application program according to the request. In addition, if the digital device does not support an application program corresponding to that indicated by the peer digital device by the use of the device advertise attribute, the digital device may indicate denial of connecting the WLAN and executing the application program according to the request.

In step 515, the digital device obtains a random number from an auto configuration attribute included in the probe request frame received from the peer digital device and generates information necessary for the WLAN connection. The auto configuration attribute is configured by including the random number as shown in Table 3 above. In this embodiment, the digital device generates at least one of an SSID, a WEP, an AES, and a PIN by applying the random number to specified hash functions, and generates an IP address by using the random number according to a specified rule as shown in FIG. 7 below. For example, if the digital device and the peer digital device support the IEEE 802.11 standard, the digital device may generate the SSID, the AES, and the IP address, and if they support the FA WPS standard, the digital device may generate the PIN.

In step 517, the digital device attempts the WLAN connection to the peer digital device by using the generated information. If the WLAN connection is complete, proceeding to step 519, the digital device automatically executes a WLAN-based application, program. The digital device performs a process for connecting the WLAN according to a standard determined by considering a standard supported by the digital device and a standard supported by the peer digital device. In addition, the digital device may confirm an application program being executed by the peer digital device from the device advertise attribute of the probe request frame, and may automatically execute an application program corresponding to the confirmed application program. For example, if the peer digital device executes a photo transfer program, the digital device may execute an application program for proving a function of receiving and editing a photo from the peer digital device.

Thereafter, the procedure of FIG. 5 ends.

Figure 6:
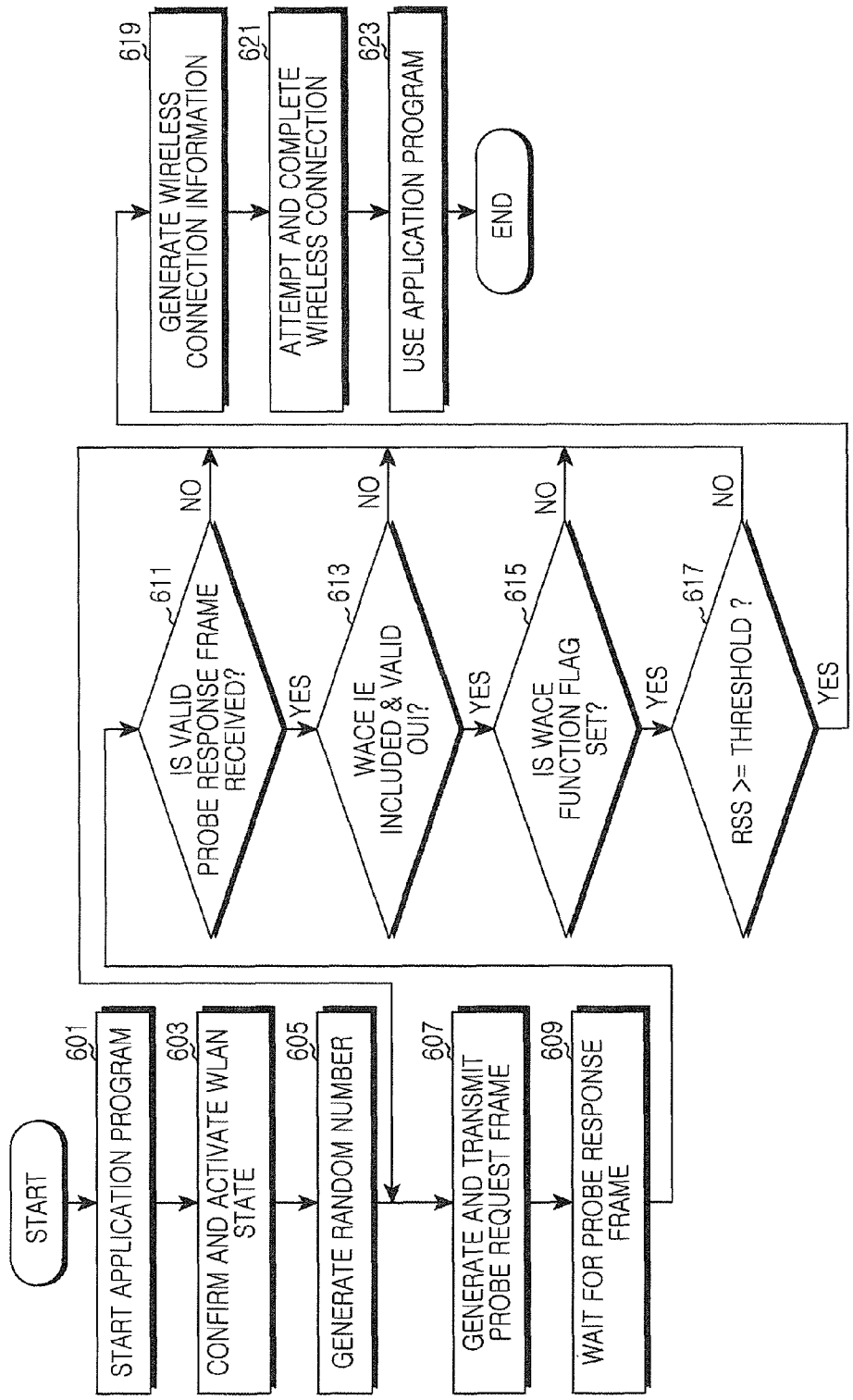
FIG. 6 illustrates an example WLAN connection process of a peer digital device in an ac-hoc mode according to this disclosure.

FIG. 6 illustrates an example WLAN connection process of a peer digital device in an ac-hoc mode according to this disclosure. A digital device operates in the ad-hoc mode according to the WFA Wi-Fi Direct standard or the IEEE 802.11 standard.

Referring to FIG. 6, when a WLAN-based application program starts by user's manipulation in step 601, proceeding to step 603, the digital device examines an active state of a WLAN module, and if the WLAN module is in an inactive state, switches the WLAN modules to the active state.

In step 605, the digital device generates a random number for generating WLAN connection information. Thereafter, in step 607, the digital device generates a probe request frame including the random number and transmits the probe request frame to the peer digital device. The probe request frame includes the device advertise attribute describe in Table 2 above and the auto configuration attribute described in Table 3 above. In this embodiment, the digital device sets the WACE function On/Off flag of the device advertise attribute to 'On', and sets the WACE supported standard flag to indicate one of the IEEE 802.11 STA and the WFA WPS is supported. In particular, the digital device may set an application list of the device advertise attribute to indicate the application program that starts in step 601, and thus may request the peer digital device to automatically connect the WLAN and then execute the application program.

In step 609, the digital device waits to receive a probe response frame from the peer digital device. In step 611, the digital device examines whether a valid probe response frame is received from the peer digital device. If a status code value included in the received probe response frame is a value that indicates acceptance of the WLAN connection request, the digital device may determine that the valid probe response frame is received, and if the status code value is a value that indicates denial of the WLAN connection request, may determine that an invalid probe response frame is received. If the probe response frame is not received from the peer digital device, the procedure of FIG. 6 returns to step 607.

Otherwise, if the probe response frame is received from the peer digital device, in step 613, the digital device automatically connects the WLAN by analyzing the probe response frame, and examines whether information for executing the WLAN-based application program, i.e., WACE information, is included and whether the OUI 204 included in the probe response frame is valid. If the element ID 200 having a value of '0xDD' exists in the probe response frame, the digital device may determine that the WACE information is included in the probe response frame. In addition, the digital device may examine whether the OUI 204 included in the probe response frame indicates a vendor ID supported by the digital device in order to determine validity of the OUI 204.

If the WACE information is not included in the probe response frame or the included OUI 204 is invalid, returning to step 607, the digital device re-performs the subsequent steps.

Otherwise, if the WACE information is included in the probe response frame and the included OUI 204 is valid, in step 615, the digital device confirms the device advertise attribute from the probe response frame to determine whether the WACE function On/Off flag is set. If the WACE function On/Off flag is in an 'Off' state, the digital device confirms that the peer digital device is in a state of not supporting the WACE function, returning to step 607, the digital device re-performs the subsequent steps.

Otherwise, if the WACE function On/Off flag is an 'On' state, the digital device confirms that the peer digital device is in a state of supporting the WACE function, and proceeding to step 617, compares RSS for the probe response frame with a specified threshold. This is to determine whether the peer digital device is located near the digital device.

If the RSS is less than or equal to the specified threshold, the digital device determines that the peer digital device is not located nearby, returning to step 607, the digital device re-performs the subsequent steps.

Otherwise, if the RSS is greater than the specified threshold, the digital device determines that the peer digital device is located nearby, and proceeding to step 619, generates information necessary for the WLAN connection on the basis of the generated random number. In this embodiment, the digital device generates at least one of an SSID, a WEP, an AES, and a PIN by applying the random number to specified hash functions, and generates an IP address by using the random number according to a specified rule as shown in FIG. 7. If the digital device and the peer digital device support the IEEE 802.11 standard, the digital device may generate the SSID, the WEP, the AES, and the IP address, and if they support the FA WPS standard, the digital device may generate the PIN.

In step 621, the digital device attempts the WLAN connection to the peer digital device by using the generated information, and if the WLAN connection is complete, proceeding to step 623, executes the application program that starts in step 601 on the basis of the connected WLAN. The digital device performs a process for connecting the WLAN according to a supported standard indicated by the WACE supported standard flag of the probe response frame received from the peer digital device.

Thereafter, the procedure of FIG. 6 ends.

Although it has been described above in FIG. 3 to FIG. 6 that each of two digital devices that perform a WLAN connection compares RSS with a threshold to determine whether the digital devices are located nearby, the determination may be performed for only one of the two digital devices.

FIG. 7 illustrates an example process of generating an IP address in a digital device according to this disclosure. It is assumed that, when a private IP address of the digital device is configured, upper 24 bits are used as a prefix part corresponding to a network part. In this embodiment, a host part may be configured with '8' bits so that '256' addresses are allocated to each subnet. However, since '0' and '255' are used for extra usages in the host part, an actually available address range of the host part is '1' to '254', that is, '254' addresses in total. The reason of configuring the host part with '8' bits in the present invention is to consider not only a 1:1 connection but also 1:N, N:1, and N:N connections when a WLAN connection is established between digital devices.

Referring to FIG. 7, the digital device obtains a random number in step 701. In this embodiment, the random number may be directly generated by the digital device, or may be received from a peer digital device.

In step 703, the digital device obtains a 32-bit hash value by applying the random number to a specified hash function.

In step 705, the digital device generates a prefix part corresponding to each class of a private IP address by using upper '24' bits from the obtained 32-bit hash value, and generates a host part by performing a modulo operation on the 32-bit hash value.

Since the IP address that may be used by being allocated as the private IP address is classified into three classes in the digital device, the digital device of the present invention may generate three prefix parts corresponding to the three classes by using the upper '24' bits of the hash value.

Class A: 10.0.0.0~10.255.255.255 (10/8 prefix)
Class B: 172.16.0.0~72.31.255.255 (172.16/12 prefix)
Class C: 192.168.0.0~192.168.255.255 (192.168/16 prefix)

When the prefix parts respectively corresponding to the classes A, B, and C are generated, the digital device generates the host part by performing a modulo operation on the 32-bit hash value according to Equation (1) below, and then generates an IP address for each class by combining the host part with the prefix part generated for each class.

$$\text{Host\_Part} = X\%254 + 1 \tag{1}$$

In Equation (1), X denotes a 32-bit hash value. The modulo operation is performed with a value '254' because the host part may use any value in the range of '1' to '254' except for '0' and '255.'

IP addresses of two digital devices intended to be connected through a WLAN have to be configured such that prefix parts are identical and host parts are different. Thus, the peer digital device of the digital device is generated such that a prefix part of an IP address is generated in the same manner as that of the digital device, but a host part of the IP address is generated in a different manner from that of the digital device. For example, the peer digital device may generate a host part according to Equation (1) above, and then may add a specific number to the generated host part or may subtract a specific number from the generated host part so that the generated host part has a different value from that of the digital device.

The digital device may configure the host part of the IP address in a different manner from a case of using Equation (1) above.

Thereafter, the digital device configures the generated IP address in step 707. That is, the digital device configures an IP address, a subnet mask, a gateway, and a Domain Name Server (DNS) for the digital device on the basis of the generated IP address. Of course, since the IP addresses are generated for the three classes in step 705, the digital device may configure each of the three IP addresses.

In step 709, the digital device performs a collision test on each of the configured IP addresses, recognizes a valid IP address according to whether a response is successful by performing an Internet Control Message Protocol (ICMP) ping test for IP addresses which are determined to not collide as a result of the collision test, and determines the recognized IP address as an IP address to be used for the WLAN connection. If there are a plurality of valid IP addresses, one IP address may be determined as an IP address to be used for the WLAN connection according to a class priority. The digital device performs the collision test by comparing a prefix part of the IP address configured through another interface of the digital device with a prefix part of the generated three IP addresses. That is, if a result of the comparison shows that an IP address having the same prefix part already exists, the digital device determines that an IP address corresponding to the same address among the three IP addresses collides, and thus deletes the IP address.

Thereafter, the procedure of FIG. 7 ends.

According to exemplary embodiments of the present invention, each of digital devices determines whether the digital devices are located nearby, generates information necessary for a WLAN connection on the basis of a random number to automatically connect the WLAN, and then automatically executes a corresponding application program. Therefore, a WLAN connection function may be easily used even by users who do not have sufficient preliminary knowledge on the WLAN connection. Since an additional user input is not required, a WLAN connection time may be reduced, and the WLAN connection is possible even in a digital device which does not have an input device. In addition, the random number is modified whenever the WLAN connection is established in the digital device, and thus there is an advantage in that security is strengthened.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of connecting a wireless network of a digital device, the method comprising:
    receiving a signal from a peer digital device;
    comparing Receive Signal Strength (RSS) of the received signal with a specified threshold to determine whether the peer digital device is located nearby; and
    if it is determined that the peer digital device is located nearby, establishing a Wireless Local Area Network (WLAN) connection to the peer digital device,
    wherein the establishing of the WLAN connection to the peer digital device comprises:
        obtaining a random number, and
        generating information necessary for the WLAN connection on the basis of the obtained random number, and
    wherein the information necessary for the WLAN connection comprises at least one of a service set identifier (SSID), a security key, an Internet Protocol (IP) address, or a personal identification number (PIN).

2. The method of claim 1, wherein the random number is generated by the digital device or is received from the peer digital device.

3. The method of claim 1, wherein the SSID, the security key, the IP address, and the PIN are generated by applying the random number to a specified hash function.

4. The method of claim 1, further comprising:
    receiving a request of executing an application program that uses the WLAN connection; and
    transmitting and receiving a frame necessary for the WLAN connection to the peer digital device.

5. The method of claim 4, wherein the frame necessary for the WLAN connection comprises at least one of a beacon frame, a probe request frame, or a probe response frame, and wherein each frame comprises at least one of an element IDentifier (ID), a length, an Organizationally Unique Identifier (OUI), an OUI type, or attribute information necessary for WLAN automatic connection and execution.

6. The method of claim 5, wherein the beacon frame comprises at least one of an attribute ID, a length, an On/Off flag for indicating an active state of the WLAN automatic connection and execution, a standard flag for indicating a supported WLAN standard, an application list for indicating an application program that uses the WLAN connection, or a category for indicating a type of the digital device.

7. The method of claim 5, wherein the probe request frame comprises at least one of an attribute ID, a length, an On/Off flag for indicating an active state of the WLAN automatic connection and execution, a standard flag for indicating a supported WLAN standard, an application list for indicating an application program that uses the WLAN connection, a category for indicating a type of the digital device, or a random number.

8. The method of claim 5, wherein the probe response frame comprises at least one of an attribute ID, a length, an On/Off flag for indicating an active state of the WLAN automatic connection and execution, a standard flag for indicating a supported WLAN standard, an application list for indicating an application program that uses the WLAN connection, a category for indicating a type of the digital device, or a status code for indicating whether a WLAN automatic connection and execution request is allowed or denied.

9. The method of claim 1, further comprising:
    determining whether the peer digital device supports a WLAN automatic connection and execution function; and
    determining whether the digital device and the peer digital device support the same WLAN connection standard.

10. The method of claim 1, wherein the random number is used to configure the IP address depending on a specified rule.

11. An apparatus for connecting a wireless network of a digital device, the apparatus comprising:
    a Wireless Local Area Network (WLAN) module configured to receive a signal from a peer digital device; and
    a controller configured to compare Receive Signal Strength (RSS) of the received signal with a specified threshold to determine whether the peer digital device is located nearby, and if it is determined that the peer digital device is located nearby, establish a WLAN connection to the peer digital device,
    wherein the controller is configured to obtain a random number to generate information necessary for the WLAN connection, and
    wherein the information necessary for the WLAN connection comprises at least one of a service set identifier (SSID), a security key, an Internet Protocol (IP) address, or a personal identification number (PIN).

12. The apparatus of claim 11, wherein the random number is generated by the digital device or is received from the peer digital device.

13. The apparatus of claim 11, wherein the SSID, the security key, the IP address, and the PIN are generated by applying the random number to a specified hash function.

14. The apparatus of claim 11, wherein the controller is configured to receive a request of executing an application program that uses the WLAN connection, and then transmit and receive a frame necessary for the WLAN connection to the peer digital device.

15. The apparatus of claim 14,
    wherein the frame necessary for the WLAN connection comprises at least one of a beacon frame, a probe request frame, or a probe response frame, and wherein each frame comprises at least one of an element IDentifier (ID), a length, an Organizationally Unique Identifier (OUI), an OUI type, or attribute information necessary for WLAN automatic connection and execution.

16. The apparatus of claim 15, wherein the beacon frame comprises at least one of an attribute ID, a length, an On/Off flag configured to indicate an active state of the WLAN automatic connection and execution, a standard flag configured to indicate a supported WLAN standard, an application list configured to indicate an application program that uses the WLAN connection, or a category configured to indicate a type of the digital device.

17. The apparatus of claim 15, wherein the probe request frame comprises at least one of an attribute ID, a length, an On/Off flag configured to indicate an active state of the WLAN automatic connection and execution, a standard flag configured to indicate a supported WLAN standard, an application list configured to indicate an application program that uses the WLAN connection, a category configured to indicate a type of the digital device, or a random number.

18. The apparatus of claim 15, wherein the probe response frame comprises at least one of an attribute ID, a length, an On/Off flag configured to indicate an active state of the WLAN automatic connection and execution, a standard flag configured to indicate a supported WLAN standard, an application list configured to indicate an application program that uses the WLAN connection, a category configured to indicate a type of the digital device, or a status code configured to indicate whether a WLAN automatic connection and execution request is allowed or denied.

19. The apparatus of claim 11, wherein the controller is configured to determine whether the peer digital device supports a WLAN automatic connection and execution function, and determine whether the digital device and the peer digital device support the same WLAN connection standard.

20. The apparatus of claim 11, wherein the random number is used to configure the IP address depending on a specified rule.

* * * * *